Patented Oct. 6, 1953

2,654,754

UNITED STATES PATENT OFFICE 2,654,754

SUBSTITUTED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application December 16, 1950, Serial No. 201,241

9 Claims. (Cl. 260—247.2)

This invention relates to new substituted glycinamides having the general formula

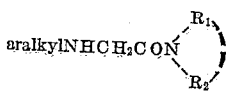

It has been observed by some investigators that a limited number of glycinamide derivatives evidence some local anesthetic action although a systematic study of the pharmacological actions of substituted glycinamides had never been reported.

We have found, in the preparation and a thorough study of a great number of new, substituted glycinamides that a relatively large number of these compounds evidence marked pharmacological actions hitherto unsuspected in the art and which we consider to be highly useful in the medicinal field. Specifically, we have found that when particular amines are used in the preparation of the compounds of our invention, the glycinamide products evidence useful pharmacological action, more specifically described below.

In the formula as given above, the term "aralkyl" is intended to cover both unsubstituted and substituted aromatic radicals and specifically a radical having from one to four carbon atoms in the alkyl chain, one of which is connected to the amino nitrogen atom. The aryl portion of the radical which may comprise one or two phenyl rings is attached either to the same carbon atom, as in the case of the diphenylmethyl radical, or to the next adjacent carbon atom, as in the case of the beta-phenylethyl radicals.

It is further contemplated that the alkyl chain and/or the aryl portion of the aralkyl radical may be hydroxy- or lower alkoxy-substituted, such radicals imparting improved solubility characteristics to the glycinamide compound. In addition, the alkyl chain may be of the straight or branched-chain type.

Considering now the radical

this is intended to represent a nitrogen-containing heterocyclic radical where $R_1$ and $R_2$ stand for non-metallic atoms capable of completing a heterocyclic nucleus, the entire ring including the nitrogen atom above indicated comprising 5 and 6 membered heterocyclics.

As examples of five membered rings contemplated by this invention may be mentioned triazole, the reduced triazoles, the reduced pyrroles and imidazoles. As examples of six membered rings contemplated by the invention may be mentioned piperidine, the reduced isoquinilines, morpholine and thiomorpholine. The 5 or 6 membered ring may have a benzene nucleus fused to the ring, as for example, benzotriazole. The ring may contain in addition to nitrogen, oxygen or sulfur as part of the ring structure. Moreover, the aralkyl, alkyl, oxy, hydroxy and alkoxy derivatives of the ring are also contemplated. The important limitation is, however, that when

represents a nitrogen-containing heterocyclic, the heterocyclic compound used to form the substituted glycinamide must be the equivalent of a secondary amine. That is, one nitrogen in the ring must have a replaceable hydrogen atom.

In general, the compounds of the invention may be synthesized by reacting an appropriate chloracetamide corresponding to the formula

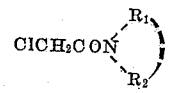

with an appropriate primary amine corresponding to the formula aralkylNH$_2$ where "aralkyl" and

represent the radicals as indicated hereinbefore.

The primary amine may be prepared in the usual and known manner. The preferred method for the preparation of the chloracetamide intermediate involves reacting chloracetyl chloride with a heterocyclic amine

in the presence of benzene or ether as a solvent for the reactants. Heating may or may not be necessary depending on the speed of the particular reaction. The chloracetamide remains in solution in the solvent and is obtained by distilling off the solvent under reduced pressure.

In general, a molar ratio of chloride to amine of about 1:2 is preferred for the reaction.

The reaction of the appropriate chloracetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally, a reaction or refluxing time of about 10-15 hours is sufficient for complete reaction. In the event that solids are formed these are removed by filtration, the substituted glycinamide product remaining in solution in the solvent. The solvent is finally removed by distillation at low pressures to obtain the desired product.

The new compounds are highly useful as intermediates in the preparation of other more complex acetamides or other fatty acid amides, in the preparation of new quaternary ammonium salts, or other uses of like nature. Moreover, as pointed out initially, many of the compounds have a pronounced pharmacological action in that they possess one or more of the following actions: local anesthetic, pressor, depressor, convulsant, spasmolytic, analgesic, sedative, soporific and other useful effects on the living system.

It is known that certain amines possess a vasoconstrictor action and are identified as pressor amines. As an important feature of the invention it has been discovered that when pressor amines, represented particularly by the above-mentioned aralkylNH₂ amines are used in the reaction, the new products possess pronounced physiological action. Thus, in these substituted glycinamides, when a pressor amine has been combined on the amino (left hand) side of the molecule, the compounds possess very considerable anesthetic action. While pressor amines themselves possess a certain amount of local anesthetic action, a surprising increase in anesthetic action has been found in the corresponding glycinamide compounds.

As an example, when the primary pressor amine 1-methyl-2-phenylethylamine is condensed with N-alpha-chloracetyl piperidine, it has been found that the primary pressor amine residue

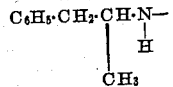

imparts to the glycinamide enhanced local anesthetic action far superior to the anesthetic action of 1-methyl-2-phenylethylamine itself. It should be pointed out, however, that the use of pressor amines is not invariably necessary in order to obtain the substituted glycinamides of our invention having highly useful physiological properties.

Proceeding to a better understanding of the invention, illustrative specific procedures for the preparation of representative compounds falling within the general formula are set forth in the following examples.

EXAMPLE 1

*Preparation of alpha-(2-phenylethylamino)-acetyl piperidine*

In order to prepare the chloracetamide intermediate, 226 grams of chloracetyl chloride were dissolved in 2500 cc. of benzene and 360 grams of piperidine dissolved in 1000 cc. of benzene were added dropwise thereto while maintaining the temperature at 10-20° C. The piperidine hydrochloride was filtered off, the benzene evaporated and the oil distilled at 118-123° C. at a pressure of 3 mm. The yield of N-alpha-chloracetyl piperidine amounted to 180 grams.

A solution of 13 grams of N-alpha-chloracetyl piperidine and 10 grams of beta-phenylethyl amine in 25 cc. of n-butanol together with 7 grams of sodium carbonate was refluxed for 12 hours. The organic layer was then washed with water, until the washings were free of halogen, and the liquid as dried, concentrated in vacuo and distilled. The product was a pale yellow oil boiling at 190-195° C. at a pressure of 3 mm. The yield of alpha-(2-phenylethylamino) acetyl piperidine was 4 grams.

Instead of beta-phenylethyl amine for the above reaction, the compound 3',4'-dimethoxy-beta-phenylethyl amine may be reacted in the same way with the N-alpha-chloracetyl piperidine and in the same molar proportions. There would thus be produced alpha-N-2-(3',4'-dimethoxyphenyl) ethylamino-acetyl piperidine. Likewise, the chloracetyl compound may be reacted with 2-methoxy-2-phenylethyl amine under the same conditions and in the same molar proportions to produce as a final product alpha-(2-methoxy-2-phenylethylamino)-acetyl piperidine.

EXAMPLE 2

*Preparation of alpha-(1-methyl-2-phenylethylamino)-acetyl piperidine*

A solution of 6 grams of N-alpha-chloracetyl piperidine (prepared as in Example 1) and 5 grams of dl-amphetamine together with 3 grams of sodium carbonate in 25 cc. of n-butanol was refluxed for 12 hours. The solids were filtered off and the filtrate concentrated in vacuo and distilled. The product boiled at 154-160° at a pressure of 2 mm. The yield of alpha-(1-methyl-2-phenylethylamino) acetyl piperidine was 5 grams.

EXAMPLE 3

*Preparation of alpha-(1-methyl-2-phenylethylamino) - N - acetyl - 3 - methyl - 1,2,3,4 - tetrahydro isoquinoline*

To 250° cc. of toluene contained in a 500 cc. three-neck flask equipped with a mechanical stirrer and Dry Ice bath was added 45 grams of 3-methyl-1,2,3,4-tetrahydro isoquinoline, 30 grams of pyridine and 35 grams of chloracetylchloride. The latter being dropped in slowly to keep the temperature between 20° and 30° C. The mixture was allowed to warm to room temperature with stirring. It was then washed four times with water and dried with magnesium sulfate. The toluene was next concentrated.

To 200 cc. of n-butyl alcohol contained in a 500 cc. three-neck flask, equipped with a mechanical stirrer and reflux condenser, was added 23 grams of crude N-chloraceto-3-methyl-1,2,3,4-tetrahydro isoquinoline, 14 grams of beta-phenylisopropyl amine and 30 grams of dry sodium carbonate. The reaction mixture was refluxed overnight and then filtered to remove inorganic salts. It was then washed with 10% sodium hydroxide solution, concentrated and distilled. B. P. 210° C. at .5 mm.

In the same manner, the N-alpha-chloracetyl piperidino or isoquinilino compound may be reacted with 1-methyl-2-(p-hydroxyphenyl)ethyl amine under the same conditions and molar proportions. The final compound would be alpha-(1 - methyl - 2 - (p-hydroxyphenyl) ethylamino) - acetyl piperidine or 3-methyl-1,2,3,4-tetrahydro isoquiniline.

EXAMPLE 4

*Preparation of alpha-benzylamino-aceto piperidine*

5.3 grams of benzylamine and 8 grams of chloracetyl piperidine were dissolved in 300 cc. amyl alcohol. 40 grams of sodium carbonate was added. The mixture was stirred and refluxed overnight. The salt was filtered out. The alcoholic residue was washed with water and distilled in vacuum. The product boiled from 184–190° C. at 0.45 mm.

EXAMPLE 5

*Preparation of alpha-(omega-phenyl-tert.butylamino)-aceto-morpholine*

3 grams of choloro-aceto morpholine and 2.7 grams omega-phenyl-tert.butylamine were dissolved in 120 cc. of amyl alcohol. To this 15 grams of sodium carbonate was added and the mixture was refluxed with stirring overnight. The salt was filtered off. The alcohol solution was washed with water and distilled in vacuum. The product boiled at 180–186° C. at .4 mm.

Instead of using omega-phenyl-tert.butylamine, one may react the chloracetyl compound with 1,1 - dimethyl - 2 - hydroxy - 2 - phenylethylamine under the same conditions and using the same molar proportions, thus resulting in the compound alpha - (1,1 - dimethyl - 2 - hydroxy-2-phenylethylamino)-acetyl piperidine.

It should likewise be pointed out that while piperidine has been frequently used as an illustration of a nitrogen-containing heterocyclic, other heterocyclic compounds as identified earlier may be used in the same manner to react with chloracetyl chloride. The conditions of reaction are the same and the molar proportions are likewise the same. As already indicated, essential factors are the use of 5 or 6-membered heterocyclic rings and the presence of a replaceable hydrogen on a ring nitrogen atom.

Substantially all of the products of the invention are high boiling basic liquids of limited solubility. It is contemplated that while the products may be used in this basic form, it is within the scope of this invention that they may be prepared and used in the form of their acid-addition salts. The preparation of an acid-addition salt is well-known and generally involves the addition of the selected acid to an ether, alcohol or water solution of the basic material. The acid is chosen to yield a salt which is known to those skilled in the art as being physiologically non-toxic. As examples, the hydrochloride, sulfate or tartrate salts of the products may be used.

It is further contemplated that those substituted glycinamides, or the non-toxic salts thereof, which are less soluble in dilute acid than 0.5% by weight may be brought into satisfactory solution by the use of solubilizing, surface-active emulsifying or detergent agents in order to obtain a more complete physiological effect of the specific glycinamide. Lipoid solvents having a physiologically non-toxic effect such as long chain fatty acid partial esters of hexitol anhydrides or oxyalkylene derivatives thereof, vegetable and animal oils and ointment bases such as petroleum jelly or cholesterol are examples of solvents that are considered useful in admixture with the substituted glycinamides for obtaining an enhanced physiological effect. Solubilization of glycinamides that are free of hydroxy groups may also be effected by forming carboxylated glycinamides. This form of glycinamide is obtained by reacting the relatively insoluble glycinamides with cyanic acid or carboxyalkyl compounds as for example chloro acetic acid or more preferably the alkaline salts of said acids.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

This application is a continuation-in-part of application Serial No. 673,154 filed May 29, 1946, now abandoned.

We claim:

1. New compounds selected from the group consisting of substituted glycinamides having the general formula

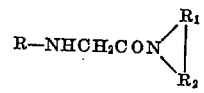

wherein R represents an aralkyl radical of the group consisting of phenyl-lower alkyl, lower-alkoxy substituted phenyl-lower alkyl and hydroxy-substituted phenyl-lower alkyl radicals, while

represents a nitrogen-containing heterocyclic nucleus selected from the group consisting of piperidine, morpholine and 3-lower alkyl-1,2,3,4-tetrahydro isoquinoline; and the non-toxic acid-addition salts thereof.

2. As a new compound, a glycinamide having the formula

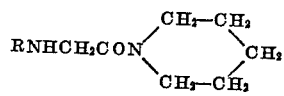

wherein R represents a phenyl-lower alkyl radical.

3. As a new compound, a glycinamide having the formula

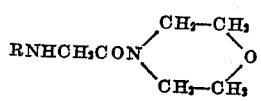

wherein R represents a phenyl-lower alkyl radical.

4. As a new compound, a glycinamide having the formula

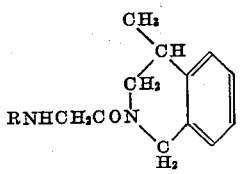

wherein R represents a phenyl-lower alkyl radical.

5. The new compound, alpha-(1-methyl-2-phenylethylamino) - N - acetyl-3 methyl-1,2,3,4-tetrahydro isoquinoline.

6. The new compound, alpha-(2-phenylethylamino)-acetyl piperidine.

7. The new compound, alpha-(1-methyl-2-phenylethylamino)-acetyl piperidine.

8. The new compound, benzylamino-aceto-piperidine.

9. The new compound, omega-phenyl-tert.-butylamino-aceto morpholine.

WILLIAM F. BRUCE.
JOSEPH SEIFTER.

References Cited in the file of this patent

UNITED STATES PATENTS

| Number | Name | Date |
|---|---|---|
| 2,139,190 | Iselin et al. | Dec. 6, 1938 |
| 2,153,707 | Becherer et al. | Apr. 11, 1939 |
| 2,411,662 | Martin et al. | Nov. 26, 1946 |
| 2,449,638 | Bruce et al. | Sept. 21, 1948 |

FOREIGN PATENTS

| Number | Country | Date |
|---|---|---|
| 718,685 | Germany | Mar. 18, 1942 |

OTHER REFERENCES

Wesseley, Chem. Abstracts, vol. 19, p. 3083 (1925).